United States Patent [19]

Jones

[11] 4,000,576
[45] Jan. 4, 1977

[54] CLAMPING APPARATUS

[76] Inventor: Claude Elmer Jones, 1406 W. 9th St., Freeport, Tex. 77541

[22] Filed: Oct. 2, 1975

[21] Appl. No.: 618,862

[52] U.S. Cl. .................................. 43/5; 294/118
[51] Int. Cl.² ..................................... A01K 97/14
[58] Field of Search ............. 43/5; 294/110 A, 111, 294/117, 118, 995

[56] References Cited

UNITED STATES PATENTS

| 144,110 | 10/1873 | Knapp | 294/110 A |
|---|---|---|---|
| 337,358 | 3/1886 | Allinson | 294/117 |
| 1,534,954 | 4/1925 | Holtz | 294/110 A |
| 2,128,579 | 8/1938 | Corey | 43/90 |
| 3,208,786 | 9/1965 | Eddleman | 43/5 |

*Primary Examiner*—Warner H. Camp
*Attorney, Agent, or Firm*—Robert V. Wilder

[57] ABSTRACT

A clamping apparatus includes two clamping members pivotally connected at a common point. A leaf spring, connected to a point on each member, tends to force the members together. The leaf spring is connected to one end of a rod, the other end of which is remote from the clamping members. The members are extended beyond the common point toward the remote end of the rod. An actuating device operable from the remote end of the rod, is connected to the extended ends of the clamping members. When the clamping members are opened, they are held in the open position until a selective operation of the actuating device initiates the closing of the clamping members. After the initiating movement, the clamping members are biased closed by the action of the leaf springs.

5 Claims, 4 Drawing Figures

CLAMPING APPARATUS

BACKGROUND OF THE INVENTION

1. Field of the Invention

The present invention relates generally to clamping devices and more particularly to remotely controlled clamping devices.

2. Description of the Prior Art

In the art of deep sea fishing, especially for the "big ones" such as sailfish, marlin, broadbill, and tuna it has in the past been standard procedure, after a fish is hooked, to reel in the line until the fish is alongside the fishing vessel. At that point, since it would be a most imposing if not impossible task to pull the fish onboard with the fishing tackle alone, a gaff of relatively sturdy construction is secured in the gill area of the fish under the operculum, and used to help pull the fish aboard. That procedure, although generally satisfactory, is subject to several shortcomings. Since the fish is only secured in the area of its gills, its caudal or tail fin section, which provides power and maneuverability, is still unrestrained in the water thus there is not only great difficulty involved in inserting the gaff, but there is also much danger since sensing the end is near, the hooked fish will exert all of his remaining strength to avoid being captured. Even if the fish is successfully landed aboard the fishing vessel, the danger to the fisherman persists and caution must be practiced to avoid the tail and bill lashes of the fish in his final last-ditch efforts to avoid capture and return to his natural aquatic environment. Heretofore, the catching of the "big one" has been unnecessarily burdensome after the major battle of bringing the fish alongside the fishing vessel has been fought and won by the fisherman. At that point it would appear to be a mutual desideratum of both the fish and the fisherman not to prolong the exercise, especially if the sole reason for the prolongation is the inadequacy of the landing equipment. Many defacing injuries are unnecessarily inflicted upon the fish if the placement of the gaff is imprecise. Further, during the gaffing process, a fish may lose 15 pounds of blood. In competition fishing, that weight loss is critical. Therefore, there is a need for a method and means for subduing and landing a fish in a manner which minimizes the danger to the fisherman and the defacation of the fish.

SUMMARY OF THE INVENTION

The present invention is provided to fulfill the foregoing and other needs. In accordance with the present invention, there has been provided a clamping apparatus including a clamping device operable between opened and closed positions. The clamping device includes a biasing means tending to force the clamping device closed. The clamping device is connected to one end of a handle means, the other end of the handle means being remote therefrom. An actuating means, selectively operable from the remote end of the handle means, is connected to the clamping device and is selectively operable to initiate the closing of the clamping device. A holding means is operable to hold the clamping device in the opened position until the selective operation of said actuating means, whereupon the holding means is released and the biasing means becomes operative to bias the clamping device to the closed position. The actuating means is further operable from the remote end of the handle means to selectively maintain a variable closing force on the clamping device in addition to the force exerted by the biasing means. After a fish is clamped by the device, it is pulled backward through the water using the clamping apparatus thereby suffocating the fish and facilitating the landing procedure.

BRIEF DESCRIPTION OF THE DRAWINGS

A better understanding of the present invention may be had when read with reference to the accompanying drawings in which.

DESCRIPTION OF THE PREFERRED EMBODIMENTS

Figure 1:
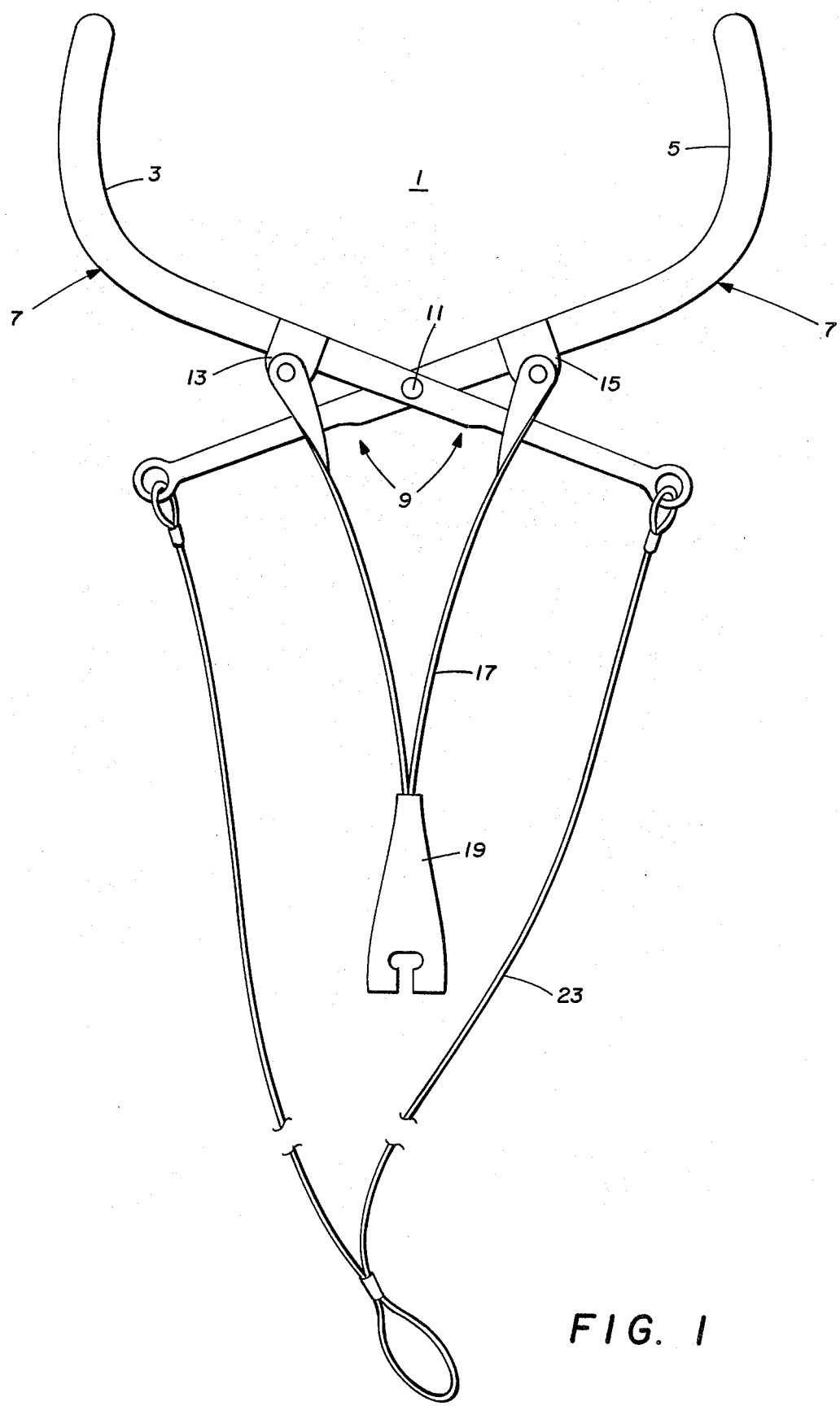
FIG. 1 is a plan view showing one embodiment of the clamping apparatus of the present invention.
Figure 2:
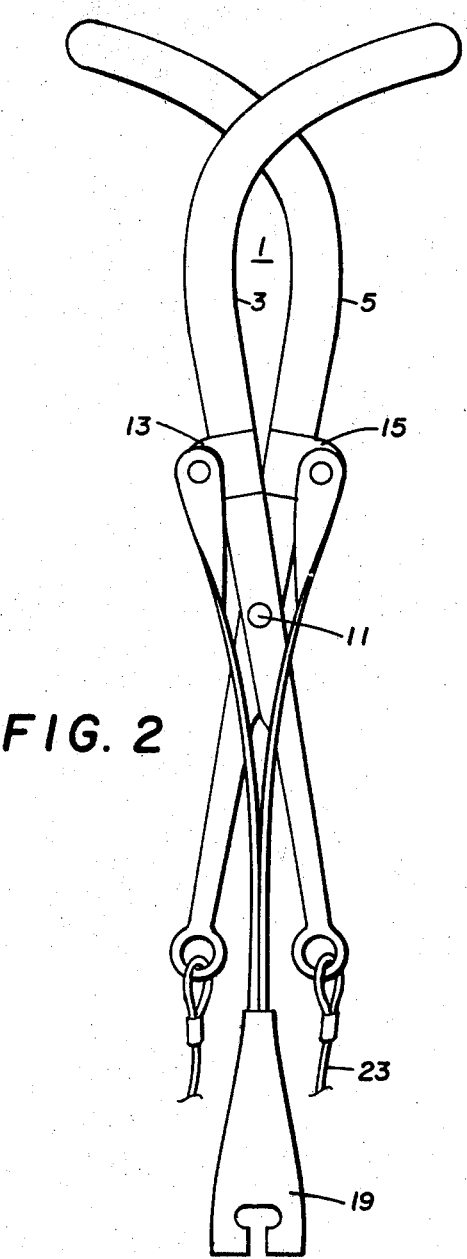
FIG. 2 is a plan view showing the clamping apparatus of FIG. 1 in the closed position.

The FIG. 1 embodiment of the clamping apparatus shows a clamping device generally indicated at 1. The clamping device 1 includes first and second clamping members 3 and 5. Each of the clamping members 3 and 5 is comprised of a curvilinear section 7 and an extended section 9. The clamping members 3 and 5 are pivotally connected together at a common point 11 which is between the curvilinear and extended sections of each member. Connection devices 13 and 15 are secured to the clamping members between the common point 11 and the curvilinear sections thereof. A biasing means such as a leaf spring 17 is pivotally attached to the connection devices 13 and 15. The biasing means 17 exerts a force on the clamping device 1 which tends to hold the clamping members 3 and 5 in the closed position as shown in FIG. 2. However, as shown in FIG. 1, when the clamping members 3 and 5 are opened to the extent shown, i.e., when the common point 11 approaches a point which lies on a line between the connection devices 13 and 15, the clamping device 1 is held in the open position until the connection devices 13 and 15 are moved forward of the common point 11. At that time, the biasing means 17 will force the clamping members 3 and 5 together. Thus, the configuration of the embodiment of the present invention shown in FIG. 1 inherently provides a holding function. That holding function may also be provided through other configurations not shown although it is believed that the configuration shown is the simplest and preferred structure by which the holding function is attained.

The biasing means 17 is secured to a cap 19 which, in turn, may be connected to a handle means or a rod 21 (shown in FIG. 3) which terminates in an area remote from the clamping device 1. The embodiment of FIG. 1 shows an actuating means 23 connected to the terminal portions of the extended sections 9 of the clamping members 3 and 5. The actuating means 23 in the example of FIG. 1 simply comprises a resilient line which is extended to be operable from the remote end of the handle means 21.

In the operation of the FIG. 1 embodiment, the clamping apparatus may be opened manually to the point at which the clamping members 3 and 5 are held in the open position as hereinbefore explained. At that time an operator will position the clamping members 3 and 5 around the portion of the fish to be clamped, which is generally that portion immediately forward of the tail or caudal fin. At that time the operator, holding the handle means in one hand, will pull the actuating means 23 thereby forcing the connection devices 13 and 15 forward of the common point 11. The holding function inherent to the clamping apparatus described will then be released and the biasing means 17 will act to force the clamping members 3 and 5 together into the closed position shown in FIG. 2 with the fish clamped therebetween. Once the fish has been clamped, the operator, by varying the force with which he pulls the actuating means 23 with respect to the handle means 21, is able to selectively vary the force applied to hold the clamping device closed. The fish may then be drowned by pulling it backwards through the water. Thereafter, it becomes a safe and routine procedure to land the fish aboard the fishing vessel without inflicting undue injury to either the fish or the fisherman.

Figure 3:
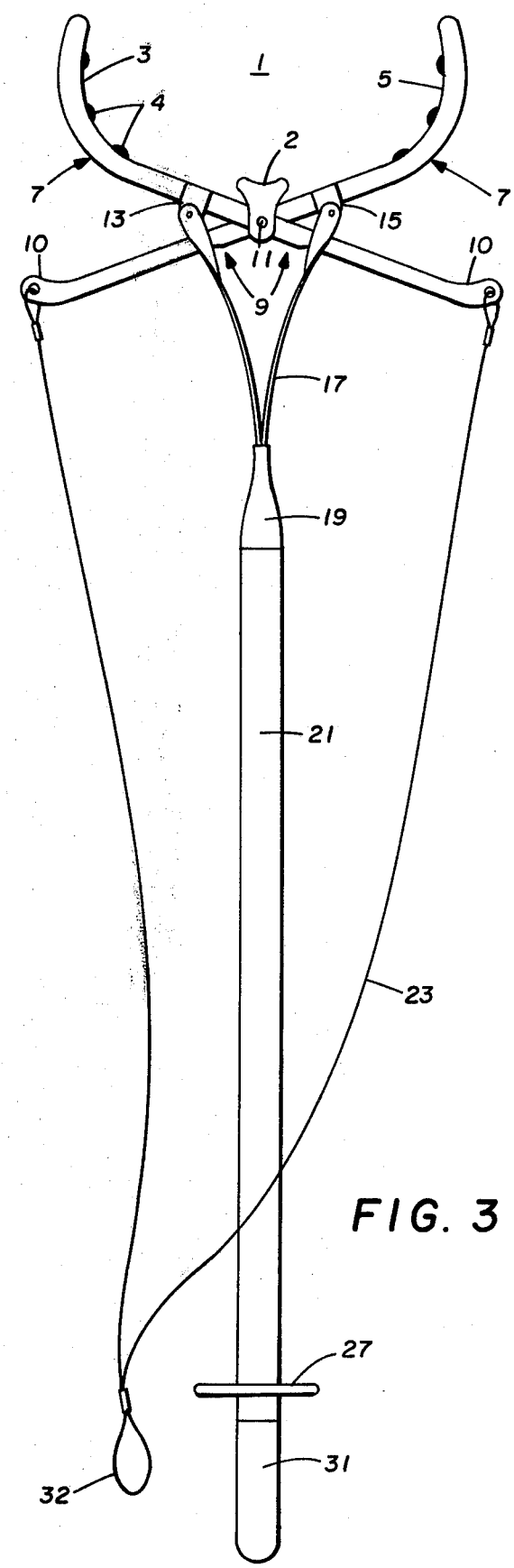
FIG. 3 is a drawing of another embodiment of the clamping apparatus of the present invention.

FIG. 3 shows another embodiment of the present invention with several modifications thereto. Like numerals indicate corresponding parts of FIG. 1. In the embodiment of FIG. 3, a self-actuating means 2 is connected to the common point 11 of the clamping device 1. When the clamping apparatus is opened and placed around the fish to be immobilized, the self-actuating means 2 is operable upon impact with the body of the fish to transmit that force or impact to the structure of the clamping apparatus which provides the holding function. That transmitted force will push the common point 11 toward the handle means 21. Since the operator is holding the handle means 21 to oppose such force, the connection devices 13 and 15 will move forwardly relative to the common point 11 upon impact, and the biasing means 17 will become operative to close the clamping apparatus as hereinbefore explained.

Figure 4:
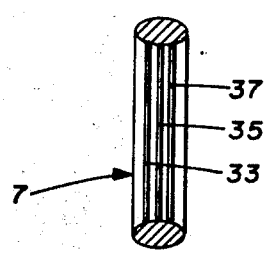
FIG. 4 is a drawing showing a further modification of one embodiment of the present invention.

A handguard 27 may be provided to further facilitate the clamping operation. The operator may hold the handle means 21 at the extreme end 31 thereof with one hand while operating the actuating means 23 by pulling the activating means or line 23 toward the handguard 27. In the FIG. 3 embodiment, the inner surfaces of the clamping members 3 and 5 include protuberances 4 which may be formed thereon by spot welding. The protuberances reduce the possibility that the fish, after being clamped, will be able to slip through the clamping device 1. FIG. 4 shows a section of another embodiment of the clamping sections 7 of the clamping members 3 and 5. In FIG. 4, the inner surface of the clamping section 7 includes ridges 33, 35 and 37. The inner surfaces of the clamping members may be completely smooth or formed with protuberances 4 shown in FIG. 3 or ridges as shown in FIG. 4, or other configurations or materials in order to increase the friction between the clamping members and the fish. The variations of the inner surface of the clamping members should not however, be so severe that the fish is damaged substantially during the clamping process.

Thus, there has been provided, in accordance with the present invention, a clamping apparatus remotely actuable to clamp and hold a fish in the area immediately forward of the tail or caudal fin.

The embodiments of the present invention in which an exclusive property or privilege is claimed are defined as follows:

1. A clamping apparatus comprising:
   a clamping device operable between opened and closed positions, said clamping device including first and second clamping members, each of said clamping members having a clamping section with a blunt clamping surface and an extended section, said clamping members being pivotally connected together at a common point between said clamping and extended sections thereof, said clamping sections being arranged to cross over one another when said clamping device is in the closed position;
   a biasing device connected to each clamping member at a point between said common point and each clamping section, said biasing device being operable to exert a force on said clamping device tending to hold said clamping device in said closed position;
   handle means having first and second ends, said first end of said handle means being connected to said biasing device, said second end of said handle means being remote from said clamping device, said clamping device and said biasing device together further including holding means operable to hold said clamping device in said opened position; and
   actuating means comprising a resilient line connected to the end of each extended section of each clamping member, said resilient line being extendible therefrom to said remote end of said handle means, said actuating means being selectively operable from an actuating point remote from said second end of said handle means, for releasing said holding means whereupon said clamping device is allowed to return to said closed position.

2. The clamping apparatus as set forth in claim 1 wherein said resilient line is connected solely to the ends of said extended sections of said clamping members.

3. The clamping apparatus as set forth in claim 2 wherein said actuating means is further selectively operable from a point remote from said second end of said handle means to provide a variable holding force in addition to the force provided by said biasing device.

4. The apparatus as set forth in claim 3 wherein said clamping sections of said clamping members include means providing at least one blunt, raised ridge running along the inner surface of each clamping section.

5. The apparatus as set forth in claim 3 wherein said clamping sections of said clamping members include at least one blunt protuberance along the inner surface thereof.

* * * * *